Figure 1:
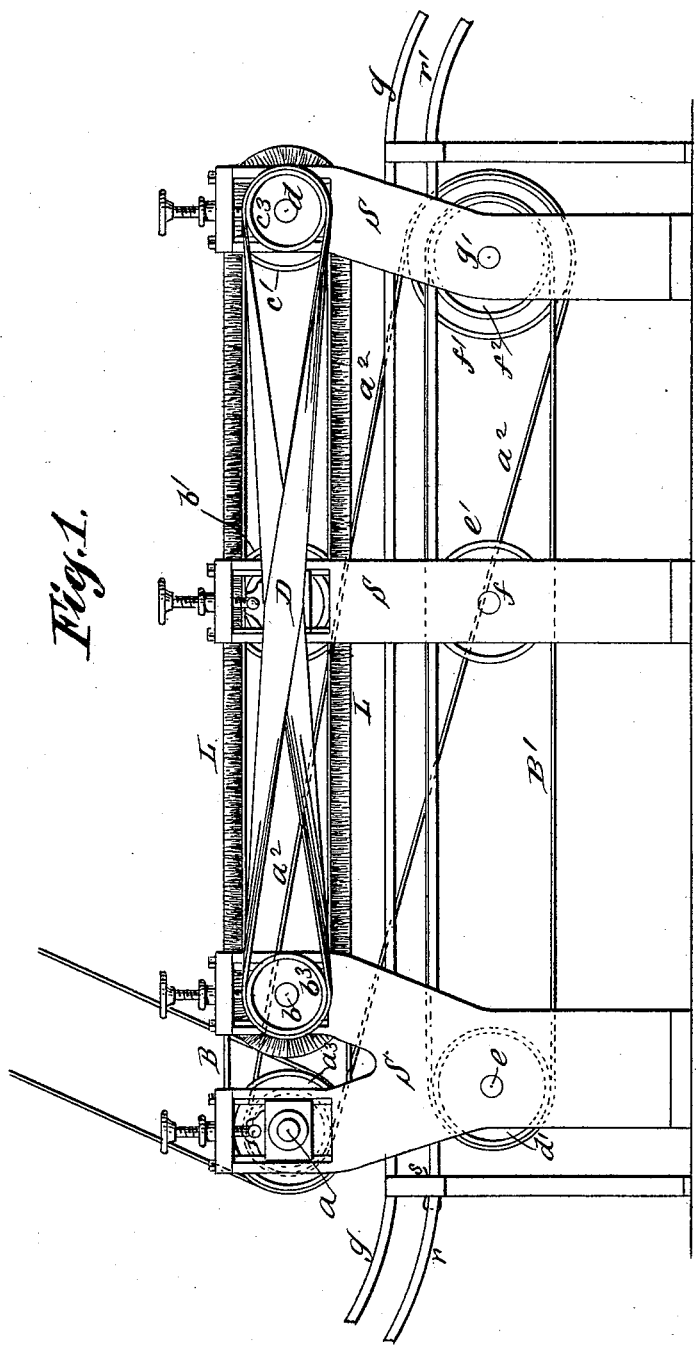

(No Model.) 3 Sheets—Sheet 1.

O. S. FELLOWS.
MEANS FOR REMOVING SUPERFLUOUS SOLDER FROM SHEET METAL CANS.

No. 586,965. Patented July 27, 1897.

(No Model.)  3 Sheets—Sheet 2.

O. S. FELLOWS.
MEANS FOR REMOVING SUPERFLUOUS SOLDER FROM SHEET METAL CANS.

No. 586,965.  Patented July 27, 1897.

Witnesses:
D. W. Gardner
Louis N. Howley

Inventor:
Olin S. Fellows
By his Attorney
George William Miatt (No Model.) 3 Sheets—Sheet 3.
O. S. FELLOWS.
MEANS FOR REMOVING SUPERFLUOUS SOLDER FROM SHEET METAL CANS.
No. 586,965. Patented July 27, 1897.
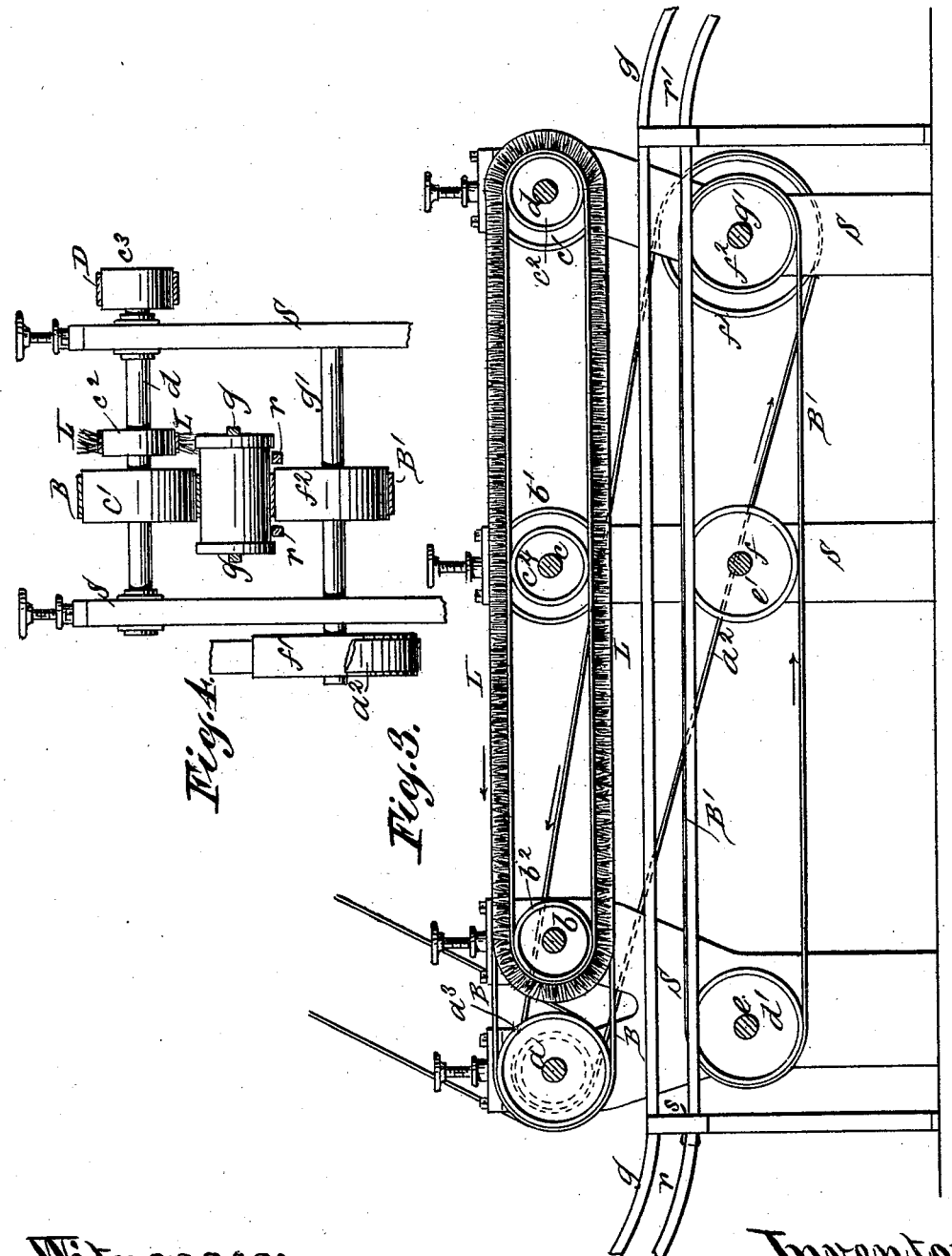
Witnesses.
O. W. Gardner.
Louis W. Rowley.
Inventor:
Olin S. Fellows
By his Attorney
George William Miatt

UNITED STATES PATENT OFFICE.

OLIN S. FELLOWS, OF MIDDLETOWN, NEW YORK.

MEANS FOR REMOVING SUPERFLUOUS SOLDER FROM SHEET-METAL CANS.

SPECIFICATION forming part of Letters Patent No. 586,965, dated July 27, 1897.

Application filed September 16, 1896. Serial No. 605,967. (No model.)

*To all whom it may concern:*

Be it known that I, OLIN S. FELLOWS, a citizen of the United States, residing at Middletown, in the county of Orange and State of New York, have invented certain new and useful Improvements in Means for Removing Superfluous Solder from Sheet-Metal Cans, of which the following is a specification sufficient to enable others skilled in the art to which the invention appertains to make and use the same.

My invention relates to the manufacture of sheet-metal cans in which the end plates are soldered to the cylindrical bodies by passing the edges of the cans over and in contact with molten solder. As set forth in my concurrent application, Serial No. 605,598, filed September 12, 1896, the edges of the cans take up and carry away an excess of solder, which is objectionable, not only on account of the waste of solder, (an item of importance in the manufacture of cans by the thousands,) but also because the unnecessary solder detracts from the symmetrical appearance of the can.

In my concurrent application hereinbefore referred to I provide for the removal of the superfluous solder by centrifugal force. I have found by investigation and experiment that a like result may be accomplished by the use of an endless brush used in conjunction with the mechanism for rotating the cans continuously and simultaneously after they leave the solder-bath. In fact, the endless brush tends to force the melted solder into the annular joint, as well as to remove all external solder, imparting to the edge of the can a finished or polished effect not otherwise attainable. The action of the brush in forcibly sweeping some of the solder into the joint while wiping off all excess is of especial importance at the junction of the annular joint with the longitudinal body joint or seam, at which point there is the greater tendency to leakage owing to the overlapping of the edges of the can-body.

I am aware that it has been proposed to use circular buffers or brushes to remove superfluous solder from cans held and treated individually. I am also aware that it has been proposed to treat cans held and rotated individually to the action of an endless wiper-belt; but neither of these ideas anticipate my invention, which consists, essentially, in treating the cans as they leave the soldering-bath to mechanism through which they will be rotated continuously and simultaneously with their freshly-soldered joints in contact with an endless brush-belt traveling in the direction opposite to that in which they travel and rotate, thus insuring the removal of the excess of melted solder and the finishing or polishing of the edges of the cans without interfering with or retarding the continuous flow or delivery of the cans from the soldering-bath, through which latter they frequently pass at the rate of one hundred or more per minute. This feature of treating the cans successively and collectively in a continuous procession without intermission is important in the manufacture of cans in large quantities, and I am the first to devise and invent mechanism for the removal of superfluous solder from the cans under such conditions as contradistinguished to the treatment of the cans specially and individually, as heretofore proposed. Thus the saving in complication and cost of mechanism, as well as in time, renders my device practical and valuable under the requirements at present prevailing in the manufacture of sheet-metal cans in large quantities for industrial purposes, a result not heretofore attained in attempts to remove superfluous solder from cans.

Figure 2:
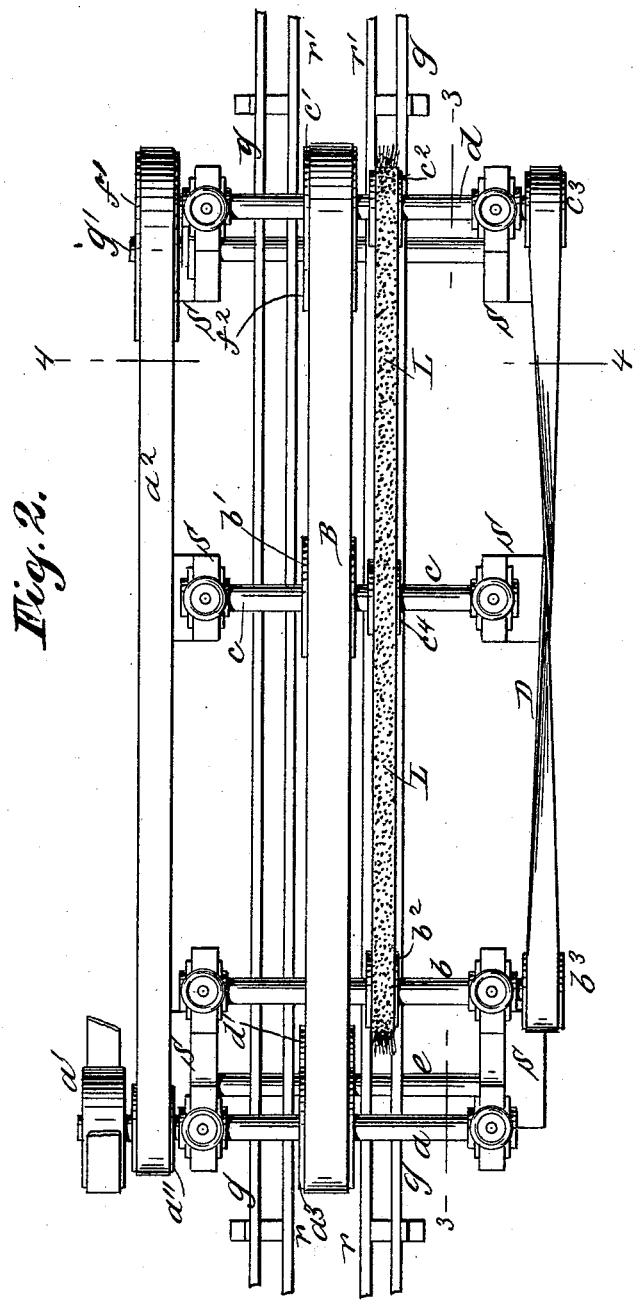

In the accompanying drawings, Figure 1 is an elevation of my improved solder-saving apparatus. Fig. 2 is a plan of the same. Fig. 3 is a sectional elevation upon plane of line 3 3, Fig. 2. Fig. 4 is a transverse section upon plane of line 4 4, Fig. 2.

Standards S support the several shafts $a$, $b$, $c$, $d$, $e$, $f$, and $g'$. The power-pulley $a'$ is secured to the shaft $a$, upon which is also mounted the transmitting-pulley $a''$, by which power is transmitted, by means of the belt $a^2$, to the pulley $f'$ on shaft $g'$, said pulley $f'$ being of greater diameter than the pulley $a''$. Pulleys $a^3$ $b'$ $c'$ support an endless belt B, while the pulleys $d'$, $e'$, and $f^2$ support a similar belt B', the opposed surfaces of which receive and act upon the cans from the rails $r\ r$, extending from the soldering-machine.

It will be seen that the adjoining and opposed surfaces of the belts B B′ travel in opposite directions, as indicated by the arrows, and at different speeds, the upper one, B, faster than the lower, so that cans fed in between the belts by the rails $r\ r$ will be rotated upon their longitudinal axes and finally discharged onto the rails $r'\ r'$ at the opposite end of the device.

$g\ g$ are guard-rails which preserve the alinement of the cans throughout their journey.

$s$ is a spring which tends to press the cans up against the under side of the belt B and thereby insure their entrance between both belts.

The upper shafts $a\ b\ c\ d$ are adjustable vertically for the purpose of regulating accurately the relative positions of the belts to conform to the requirements of the cans under treatment. The pulleys $b'\ e'$ are idlers.

Upon the shafts $b\ d$ are mounted smaller pulleys $b^2\ c^2$, supporting the endless brush-belt L. The pulley $c^4$ is an idler. Pulleys $b^3\ c^3$ on the shaft $b$ and $d$ are connected by a cross-belt D, by which power is transmitted from the shaft $d$ to the shaft $b$, causing it and the pulley $b^2$ to rotate in the opposite direction to that of the shaft $d$, and thereby imparting motion to the brush-belt L in a direction opposite to that of the belt B.

It will be seen by reference to Fig. 4 that the belts B B′ bear upon the cylindrical bodies of the cans, while the brush-belt L is so situated that it bears against the ends or edges of the cans which have passed through the soldering-bath.

The rails $r'\ r'$ extend under the brush L parallel to the upper side of the endless belt B′, but slightly below the upper surface of the latter, the object being to sustain the cans against undue depression under the action of the brush-belt.

In operation the cans from the soldering-machine are grasped by and between the belts B B′, by which they are rotated upon their longitudinal axes and gradually passed to the discharging-rails $r'\ r'$, in the meantime having their soldered edges subjected to the action of the brush-belt L, which removes all superfluous solder, at the same time positively forcing solder into or against the edges of the joints and cleaning and polishing the edges of the cans. The solder thrown off by the brush is collected and remelted for use.

The brush, instead of being an endless belt, may consist of a stationary brush of suitable length, against which the cans may be rotated, as described, but the traveling endless brush is preferable, as it affords a greater amount of contact within a given space.

I am aware that it has been proposed to use endless belts to effect the rotation of cans upon their axes for the purpose of retaining the surplus solder thereon while cooling, as in the patent to Kendall, No. 469,389, dated February 23, 1892, but in that case the cans are necessarily separated and forwarded by arms projecting from the forwarding-belt and are not spaced and forwarded by a difference in the relative speeds of the forwarding and supporting belts, as in my construction. Neither does the Kendall patent show or suggest the use of an endless brush bearing upon the freshly-soldered ends of the cans for the purpose of removing the superfluous solder therefrom, the device in said patent being designed for the express purpose of retaining the surplus solder on the cans, as before stated, and of cooling them as rapidly as possible, whereas my invention contemplates not only the removal of the superfluous solder, but also the brushing of solder into the joints to be sealed and the polishing of the ends of the cans.

I am also aware that it has been proposed to use endless brushes for the purpose of cleaning the exteriors of bottles, as in the patent to Irrgang, No. 568,685, and I do not seek to cover the use of an endless brush for the cleaning of exterior surfaces generally or broadly, but confine myself specifically to the brushing of the solder into the joints and the removal of the surplus solder while soft from the freshly-soldered ends of sheet-metal cans by means of an endless belt bearing upon the ends of the cans only in conjunction with an endless belt or belts, by means of which the cans are presented to the action of the endless brush in continuous procession without resort to individual appliances for rotation, as set forth in the following claims.

What I claim as my invention, and desire to secure by Letters Patent, is—

1. In a solder-saving device the combination with an endless traveling belt and an opposed can-support arranged to receive the cans from a soldering-machine between them and to forward them while rotating them upon their axes, of an endless brush-belt in the same plane with and parallel to the propelling-belt, arranged to act on the freshly-soldered edges of the cans only, substantially in the manner and for the purpose described.

2. In a solder-saving device the combination with an endless traveling belt and an opposed can-support arranged to receive the cans from a soldering-machine between them and to forward them while rotating them on their axes, of an endless brush-belt in the same plane with and parallel to the propelling-belt, arranged to act on the freshly-soldered edges of the cans only, and in a direction opposite to their direction of axial rotation, for the purpose and substantially in the manner described.

3. In a solder-saving device the combination of an endless belt traveling in one direction at a comparatively high rate of speed, and an opposed endless belt traveling in the opposite direction at a lower rate of speed, said belts being arranged to receive the cans between them from a soldering-machine and to forward them while rotating them on their axes, and an endless brush-belt arranged to act on the freshly-soldered ends of the cans in a direction opposite to their direction of rotation upon their axes, for the purpose and substantially in the manner described.

OLIN S. FELLOWS.

Witnesses:
GEORGE WILLIAM MIATT,
D. W. GARDNER.